United States Patent [19]
Carr et al.

[11] 3,742,223
[45] June 26, 1973

[54] WIDE ANGLE LATERAL PHOTO-DETECTOR MEANS

[75] Inventors: Theodore G. Carr, Middlesex County, Mass.; Jon C. Richmond, Florrissant; James E. Dueker, St. Louis County; Robert G. Wagner, University City, all of Mo.

[73] Assignee: McDonnell Douglas Corporation, St. Louis, Mo.

[22] Filed: May 25, 1970

[21] Appl. No.: 40,227

[52] U.S. Cl. ........ 250/211 J, 250/203 R, 317/235 N
[51] Int. Cl. ........................................... H01l 15/00
[58] Field of Search ............... 250/211 J, 203 R, 250/211 K; 317/235 N

[56] References Cited
UNITED STATES PATENTS

| | | | |
|---|---|---|---|
| 3,596,151 | 7/1971 | Eldridge | 250/211 J X |
| 3,161,375 | 12/1964 | Ruhge | 250/211 J X |
| 3,293,440 | 12/1966 | Mueller | 250/211 J |
| 2,879,405 | 3/1959 | Pankove | 250/211 K |
| 3,211,911 | 10/1965 | Runge | 250/203 R |
| 3,028,500 | 4/1962 | Wallmark | 250/211 J |
| 3,351,493 | 11/1967 | Weiman et al. | 250/211 J X |

*Primary Examiner*—Walter Stolwein
*Attorney*—Charles B. Haverstock

[57] ABSTRACT

A wide angle photo-detector device for use in optical systems including optical sighting, tracking and guidance systems, said detector including a semi-conductor wafer element having a transparent or semi-transparent conductive barrier forming layer on one surface thereof and one or more electrodes arranged on the opposite surface in such manner that when incident emitted or reflected light received from a remote location impinges on the rectifying barrier layer output signals will be produced at the said electrodes, which signals are responsive to the location on the device where the incident light impinges, and means electrically biasing and loading said detector device.

16 Claims, 3 Drawing Figures

PATENTED JUN 26 1973 3,742,223
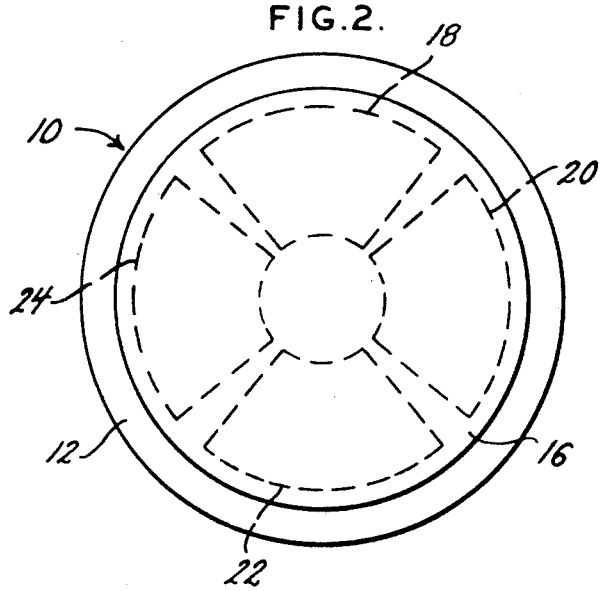
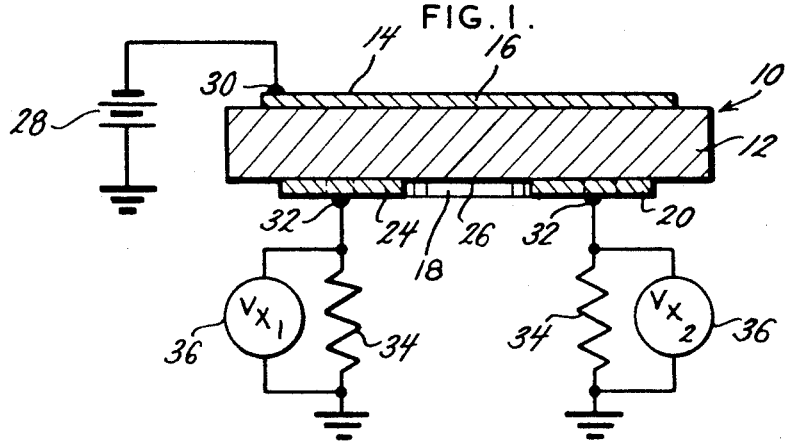
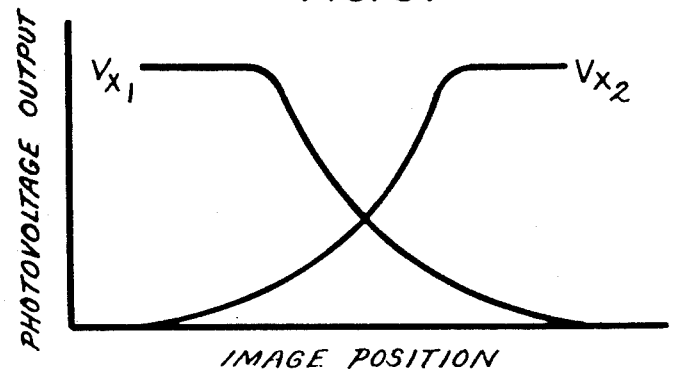

WIDE ANGLE LATERAL PHOTO-DETECTOR MEANS

Many photo-voltaic and photo-detecting devices have been constructed and used for various purposes, and many of the known devices have portions constructed of semiconductor materials. One of the principal shortcomings and limitations of the known detectors, however, is their inability to be able to operate accurately and reliably over relatively wide angles especially when used in association with conventional optical devices. The state of the art devices for the most part also require scanning and other mechanisms, and/or mosaic detector array techniques in their operations which are not required or necessary with the present device, and this as well as other features of the present device represents important structural and operational advantages for the present device. Furthermore, the wide angle characteristics which distinguish the present device make it particularly suitable and adaptable for use in guidance and tracking systems which make use of incident or reflected light received from remote locations in their guidance and tracking operations.

It is also important to keep in mind that the present device is a semi-conductor device which has a barrier whereby it can produce output electric signals or responses which can be used for automatic tracking or guidance purposes. This is to be distinguished from light amplifier type devices which produce visible images and usually require an operator which is not so of the present device.

It is therefore a principal object of the present invention to provide a light detector having an extremely wide field of view as compared with known light detecting devices and which is capable of operating with conventional optical devices and systems.

Another object is to teach the construction and operation of relatively simple light detector means which do not require scanning or mosaic detector means in association therewith.

Another object is to provide a relatively inexpensive and easy to construct wide angle light detector.

Another object is to provide a semi-conductor light detector capable of producing electric output responses from which the location of impingement of incident light thereon can be determined.

Another object is to provide simplified input and output means for a lateral photo-detector device.

Another object is to provide means by which tracking and guidance operation can be performed automatically.

Another object is to simplify the construction and operation of guidance and tracking devices which respond to light received from remote locations.

Another object is to provide a light detector element that has a target acquisition region which provides quadrant error information and at least one other region that has relatively high resolution position indicating capability for tracking and/or guidance purposes.

Another object is to teach the construction of a photo-detector that can respond to inputs that are intensity modulated at relatively high frequencies or short pulse durations.

Another object is to provide a semi-conductor photo-detector element whose field of view can be increased by proper selection of the size and spacing between electrodes formed on one surface thereof.

Another object is to provide a lateral photo-detector capable of producing output signal responses in response to various kinds of incident light including visible and invisible light as well as coherent or laser light.

Another object is to provide a photo-detector device that can be used to locate large as well as small images in relation to the surface area of the detector on which they impinge.

Another object is to provide a frequency sensitive semi-conductor photo-detector whose physical and operational characteristics are improved by basing them on the frequency characteristics of the incident light impinging thereon.

Another object is to provide a tracking sensor with extended detection range in the operational situation in which the maximum angular correction is required.

These and other objects and advantages of the present device will become apparent after considering the following detailed specification which discloses a preferred embodiment of the subject device in conjunction with the accompanying drawing wherein:

FIG. 1 is a cross-sectional view taken through the center of a photo-detector device constructed according to the present invention, the electrical circuit connections for the subject device also being shown;

FIG. 2 is a top plan view of the detector of FIG. 1; and,

FIG. 3 is a graph showing a plot of the output voltage of the subject detector device as a function of the position that an incident light spot impinges thereon.

Referring to the drawing more particularly by reference numbers, number 10 refers to a lateral photo-detector constructed according to the present invention. The detector 10 includes a body of a solid semiconductor crystal material 12 having a thickness that is selected to be much less than its other linear or lateral dimensions. Incident light from a remote source impinges on one surface 14 of the crystal body 10 which surface is formed on and by a transparent conductive metallic front electrode layer 16. The electrode 16 can be formed on the body 12 by a deposition technique in which the metal that forms the layer 16 is deposited thereon. A rectifying barrier, such as a Schottky barrier, is formed by and between the body 12 and the layer 16. Various means for depositing such a layer are well known in the art. Alternatively, a p-n junction may replace the Schottky barrier structure.

The surface of the semi-conductor body layer 12 opposite from the electrode layer 16 has formed on it a plurality of spaced electrode layers or elements shown as the electrodes 18, 20, 22 and 24. The electrodes 18–24 are also formed of a conductive metal deposited on the semi-conductor body 12 by an evaporation and condensing or like technique. The electrodes 18–24 are shown as being arcuate in shape and are spaced from each other across and around a central portion 26 of the semi-conductor body 12 which is shown as being uncovered or uncoated although it could be covered with some electrically non-conductive material, if desired. The central uncovered or uncoated portion 26 is important to the operation of the device as will be explained, and its physical size and shape is also important and should be selected depending on the modulation frequency of the incident light that is to impinge on the device. For example, if a relatively high modulation frequency is received by the detector, then the region 26 will usually be made smaller than if light is received containing a lower modulation frequency.

The transparent electrode 16 on the side of the body that is exposed to the incident light is biased electrically by means of a biasing battery 28 which has its negative terminal connected to the layer 16 and its positive terminal grounded. It should also be noted that the connection to the biasing battery 28 is made to the layer 16 at a terminal 30 shown located near the edge thereof.

Each of the spaced electrodes 18-24 has an ohmic terminal or contact 32 which is connected by suitable means to one side of an associated load resistor 34, the opposite side of which is connected to ground. A separate load or signal sensing means 36 is connected across the load resistor 34 associated with each of the electrodes 18-24, and each of the sensing means produces an output signal, which varies as a function of the incident light intensity and the position of impingement of the incident light relative to the associated electrode 18-24. For example, the output signals will vary with the lateral distance between the intensity centroid of the incident image and the edge of the associated electrodes 18-24. In the construction as shown similar output circuits formed by load resistors and associated signal sensitive means similar to the load resistor 34 and the signal sensitive means 36 are provided for each of the electrodes 18-24. The output signals produced by the sensors 36 are signals such as the signals $Vx_1$ and $Vx_2$ in FIG. 3.

As explained the subject detector provides electrical output voltages or signals whose magnitudes depend upon the position on the face of the detector 10 at which the intensity centroid of an image, and particularly an image of non-uniform brightness, impinges. The dimensions and shapes of the back electrodes 18-24 as well as the geometry of their arrangement on the detector are critical design parameters of the subject detector and in large measure enable the subject detector to have the wide angle detection characteristics which distinguish it.

The central region 26 formed on the backside of the detector by the space between the electrodes 18-24 is a region in which signal characteristics that are proportional to,or a function of,the lateral distances from the intensity centroid of the image to the nearest edges of the several electrodes 18-24 are produced. In other words, incident light images or the portions thereof impinging on the face of the detector 12 in the region opposite from the central region 26 will produce output signals or signal components with respect to the several electrodes which are position dependent, while incident light images or portions impinging on areas of the detector that are directly opposite from one or more of the electrodes 18-24 will produce outputs with respect to the said one or more opposite electrodes which are not position dependent with respect to said electrodes but will be with respect to the other electrodes. The signal produced by an electrode which is opposite from where the incident image impinges will, however, be at a maximum signal level for that image with respect to the said electrode while the signals produced by the other electrodes as a result of the same incident image will be at something less than maximum strength. These characteristics give the present device excellent capability for tracking and guidance applications and enables it to track or guide automatically since the outputs produced are in the forms of electrical signals rather than visible images which in other light sensitive devices require that an operator visually observe the outputs during operation. The present device is therefore capable of producing different kinds of responses, some of which are position dependent with respect to each electrode and some of which are not so dependent with respect to individual electrodes. This will be explained more fully in connection with FIG. 3.

The subject semi-conductor crystal device with its attached leads can, if desired, be packaged in a suitable holder assembly (FIG. 2) which will permit it to be easily installed as part of an optical system such that the optical parts will be located to focus light from a remote image as a spot or light region thereon. Fine focusing, however, is not ordinarily required for the subject device to operate but may add precision to its locating capabilities. When installed and operating, the subject detector, including the optics and electronics associated therewith, can be used to detect and locate emitted as well as reflected light images anywhere in a relatively wide field of view, and it can also be constructed to respond to various kinds and frequencies of light including visible as well as invisible infra-red and coherent light radiating from or being reflected from a target or other device. The device can also be used on a stationary or movable member to track or follow a stationary or movable object or target.

It is anticipated that the circuitry associated with the subject device will include not only the means shown such as the bias battery 28, the resistors 34 and the sensors 36 but also signal detecting, amplifying and processing means in association with the means 36 which operate to produce usable outputs that vary with the position and intensity of the impinging incident light. Furthermore, by proper selection of the parameters of the circuit components including the bias voltage and the load resistance, the performance of the subject detector can be substantially enhanced especially when operating on the basis of a lateral photo-effect.

Detectors constructed according to the present invention have the capabilities of providing detection and tracking of a radiating or reflecting object over an extremely wide field of view which in some cases may extend to 30° or an even greater angular range, and this is possible when using conventional optics and known semi-conductors technology. Furthermore, this can be accomplished with the subject detector mounted in a body-fixed configuration and without requiring the use of any scanning mechanisms or other means or techniques for covering the observed field of view such as a mosaic detector array technique and so forth. This therefore is a further important advantage of the present device structurally and operationally over existing tracking and guidance systems and techniques which sense or respond to light from some remote location or target.

The wide angle characteristics of the subject device can be better understood by referring to FIG. 3 which is a plot of the output voltages sensed across the load resistors associated with the two opposite electrodes 20 and 24. The graph labeled $Vx_1$ is a plot of the signal voltage detected by the means 36 which are connected across the load resistor 34 associated with the electrode 24 for different positions of an incident light spot impinging on the subject detector 10 as the spot moves across the device from left to right as seen in FIGS. 1 and 2. For example, when the incident light spot impinges at a location on the detector that is opposite from the electrode 24, the left end of the graph line $Vx_1$, a relatively large output voltage will be detected across the load resistor 34 associated with the electrode 24 and a relatively small signal will be detected across the load resistor associated with the electrode 20. As the light spot moves to the right in FIG. 1 the signal voltage detected by the means 36 ($Vx_1$) will remain constant until the spot impinges substantially opposite to the central region 26 at which time the signal voltage sensed by means $Vx_1$ will begin to decrease and will continue decreasing as the spot moves further to the right. The opposite will be true of the signal sensed by the means $Vx_2$ which will increase until the incident light spot is opposite the electrode 20 at which time the voltage detected by the means $Vx_2$ will reach a plateau and remain at a relatively high maximum value as the signal continues to move further to the right.

When the incident light spot is halfway between the electrodes 20 and 24 and opposite the central region 26 the signals $Vx_1$ and $Vx_2$ detected by the opposite sensors 36 associated with the electrodes 20 and 24 will be the same assuming both electrodes have similar load resistors and biases. This point is indicated in FIG. 3 by the point where the two curves intersect. The graph of FIG. 3 therefore clearly illustrates how the detected outputs will change with changes in the positions of the incident light spot, the outputs of the respective detector means being relatively independent of the spot location when the spot is moving in a range opposite to the detector means associated with a particular one of the electrodes 18-24 but not so for the same detector when the incident light spot is moving elsewhere on the device. The same is true for all of the electrodes and their associated load and detector means. This means that the subject device has areas which are position dependent and other areas which are not position dependent with respect to each of the sensing means, said area that is position dependent being the central region 26 which applies to all of the sensing means included. This gives the present detector special capabilities for use in target acquisition and guidance devices because it provides quadrant error information which can be used for determining the location from which incident light is coming, and it can also be made to the sensitive to the incident light intensity. In other words, when incident light impinges on the central region of the device, the outputs generated will vary in proportion to the position where the spot impinges relative to the radius or distance from the spot to the center of the device and this provides the high resolution position-indicating signals that are needed for tracking, guidance and other similar purposes. The ability of the subject device to produce proprotional position information from radiant signals is particularly important in tracking and guidance applications required for use with light signals that are intensity modulated at high frequencies or short pulse duration because under these conditions it can be shown that the spacing between the electrodes 18-24 should be reduced for improved results. Furthermore, without having electrodes formed and positioned as described herein, the useful field of view would be reduced especially for short pulse and high frequency carrier wave modulated light signals.

It is also contemplated to provide greater or fewer pairs of opposite electrodes similar to the electrodes 18-24 although it is usually only necessary to have two pairs positioned as shown since four electrodes will provide the full range of position locating outputs necessary to locate a target anywhere in the field of view for tracking, guiding and other purposes.

As explained above, the present semi-conductor detector device produces output signals as distinguished from visible images or the like such as are produced by light amplifier and like divices. This is an important difference between the present device and such devices because the signals derived from the present device can be used to provide automatic tracking and guidance without requiring that an operator actually view the input and/or outputs to maintain the device on target. This is possible because the subject device is basically a semi-conductor device, not a light amplifier, and as such it produces output signals not images. Furthermore, because of this fact the present device is able to determine the direction to the target or other image and keep it centered in the central region 26. This can be done regardless of whether the image is stationary or moving. The present device therefore is a unique combination of lateral sensing electrodes which have wide angle characteristics and many possible uses in connection with tracking and guiding devices including devices such as television imaging tubes including vidicon tubes. The device can also be used to detect emitted as well as reflected light of many different kinds or frequencies including visible, invisible and coherent or laser light. The device can also be made to follow or respond to a particular target or priority image in the field of view.

Thus there has been shown and described a novel high resolution tracking photo-detector construction using semi-conductor materials having ohmic electrodes and associated sensor means attached thereto, which detector fulfills all of the objects and advantages sought therefor. It will be apparent, however, that many changes, variations, modifications and other uses and applications of the subject device will become apparent to those skilled in the art after considering this disclosure and the accompanying drawing. All such changes, variations, modifications and other uses and applications which do not depart from the spirit and scope of the invention are deemed to be covered by the invention which is limited only by the claims which follow.

What is claimed is:

1. A photo-detector device comprising a body portion of wafer-like construction formed of semiconductor material, said body having opposite surfaces, means forming a rectifying structure including a metal barrier layer on one of said opposite wafer surfaces for exposing to incident light from a remote source, means forming at least two spaced conductive electrodes on the surface of the wafer like body opposite from the barrier layer, each of said electrodes overlaying a relatively substantial portion of said opposite surface, means respectively forming an ohmic contact with said barrier layer and with each of said spaced electrodes, said ohmic contacts being substantially smaller than the respective electrodes to which they are attached, means electrically biasing the barrier layer including a source of D. C. voltage connected to the associated ohmic contact, and separate output means connected to the contact associated with each of said spaced electrodes including impedance means and means responsive to the voltage produced across the said associated impedance means due to incident light impinging on the metal barrier layer, the magnitude of the voltages produced across the said respective impedance means having a component which varies in inverse relation to the distance on the barrier layer from which incident light impinges relative to the associated electrodes and a component which remains relatively constant with respect to light of constant intensity that impinges opposite to the said respective ones of said spaced electrodes regardless of movements of the incident light while remaining opposite thereto.

2. The photo-detector device defined in claim 1 wherein the voltage produced across the impedance means associated with each of said spaced electrodes decreases as the location on the barrier layer where the incident light impinges moves away from the said associated electrodes.

3. The photo-detector device defined in claim 1 wherein four spaced electrodes are located on the said opposite surface of the semi-conductor body, said four spaced electrodes being arranged in two spaced opposed pairs about a central region of said opposite surface.

4. A photo-detector device which combines acquisition and high resolution tracking characteristics comprising a wafer-like body constructed of a semi-conductor material, said body having opposite surfaces, a metal barrier forming layer on one of said opposite surfaces of the semi-conductor material such that when incident light impinges on said metal barrier layer hole electron pairs are released to cause current flow, means establishing a predetermined electrical bias across the barrier formed between said semi-conductor body and said barrier forming layer, a plurality of spaced conductive electrodes located on the opposite surface of the semi-conductor body from said barrier forming layer, each of said plurality of electrodes overlaying a relatively substantial portion of the said opposite surface so that incident light impinging on said wafer-like body opposite one of said electrodes can remain opposite said one electrode while moving relative to the other of said electrodes, and output means connected respectively to each of said spaced electrodes including an ohmic connection to each of said electrodes and load means and means responsive to voltages produced across the respective load means when light impinges on the barrier layer connected to each of said ohmic connections, the magnitude of the voltages produced across the said respective load means having a component which varies in an inverse relationship with the distance on the barrier layer from where incident light impinges relative to the associated electrodes, and a component which remains relatively constant with respect to light of constant intensity that impinges opposite to said respective ones of said electrodes regardless of movements thereof while remaining so opposite.

5. The photo-detector device defined in claim 4 wherein the incident light impinging on the metal barrier layer is modulated and the spacing between the said plurality of spaced electrodes is selected to be inversely related to the modulating frequency of incident impinging light to be observed.

6. The photo-detector device defined in claim 4 wherein the thickness of the semi-conductor material is substantially less than the dimensions thereof in the planes of the opposite surfaces.

7. The photo-detector device defined in claim 4 wherein the metal barrier forming layer is semi-transparent and is formed on the semi-conductor body by a thermal vacuum evaporation or like process.

8. The photo-detector device defined in claim 4 wherein the metal barrier forming layer is semi-transparent and is formed on the semi-conductor body by a diffusion process.

9. The photo-detector device defined in claim 4 in combination with a relatively wide angle optical system capable of focusing incident light received from a remote source into a spot on the barrier forming layer.

10. The photo-detector device in combination with the optical system defined in claim 9 wherein said optical system is capable of receiving and focusing incident light on the detector device that is received over an angular range of at least about 30°.

11. The photo-detector device defined in claim 4 wherein said plurality of spaced electrodes are located on the semi-conductor material in positions to define a central region therebetween, incident light impinging on said central region producing output responses in the respective responsive means that are inversely proportional to the distance from where the incident light impinges to the associated electrodes.

12. The photo-detector device defined in claim 4 wherein incident light impinging on the barrier forming layer in regions thereof opposite from a respective one of said plurality of spaced electrodes produces output responses in the associated responsive means which are at a maximum for the intensity of said incident light but are not position responsive with respect to said one electrode as long as the incident light impinges opposite from said one electrode.

13. A photo-detector device comprising a body portion of wafer-like construction formed of a semi-conductor material, said body having opposite surfaces, means forming a metal barrier layer on one of said opposite wafer surfaces for exposing to incident light from a remote location, means forming an electrode on the surface of the wafer-like body opposite from the barrier layer, said electrode including a layer of conductive material that overlays a substantial but not the entire opposite surface, separate electrical connections to the barrier layer and to said electrode, said separate connection to the electrode being substantially smaller than the area of the conductive electrode layer, means electrically biasing the barrier layer, and output means connected to the said electrode including impedance means and voltage sensitive means connected across said impedance means, said voltage sensitive means producing an output signal responsive to the incident light impinging on the barrier layer, said output having a first component which varies in an inverse relationship to the distance on the wafer-like body from where the incident light impinges relative to the said electrode, and said output having a second component which varies with the intensity of said incident light, said second output component being relatively constant with respect to incident light of constant intensity that impinges on the device opposite from the electrode regardless of movements thereof.

14. The photo-detector device defined in claim 13 wherein a plurality of said electrodes are positioned in spaced locationship on the said opposite surface of said wafer-like body.

15. A photo-detector device comprising a body portion of wafer-like construction formed of a first type of semi-conductor material, said body having opposite surfaces, means forming a rectifying structure of said body including a layer of a different second type of semi-conductor material formed on one of said opposite wafer surfaces for exposing to incident light from a remote source, said layer of second type of semi-conductor material establishing a junction between the body and said layer, means forming at least two spaced elctrodes on the surface of the wafer-like body opposite from the junction forming layer, said electrodes being layers which overlay substantial spaced areas of said opposite body surface but not the entire area of the opposite body surface, means forming respectively an ohmic contact with said junction forming layer and with each of said spaced electrodes, said ohmic contacts being substantially smaller in size and surface area than the electrodes to which they are attached, means electrically biasing the junction forming layer including a source of D. C. voltage connected to the ohmic contact, and separate output means connected to the ohmic contact associated with each of said spaced electrodes including impedance means and means connected to respond to the voltage produced across the said associated impedance means due to incident light impinging on the junction forming layer, each of said output means being capable of producing an output response having a first component that is in inverse relationship to the distance between where incident light impinges relative to the associated electrodes and a second component which remains relatively constant with respect to incident light of constant intensity that impinges opposite to said respective ones of the said electrodes regardless of movements of the incident light while remaining impinging opposite the same ones of said electrodes.

16. The photo-detector device defined in claim 15 wherein the junction formed between the two different types of semi-conductor material is a p-n type junction.

* * * * *